W. F. MANGELS.
CAROUSEL.
APPLICATION FILED JUNE 18, 1915.
1,171,220.
Patented Feb. 8, 1916.
3 SHEETS—SHEET 3.
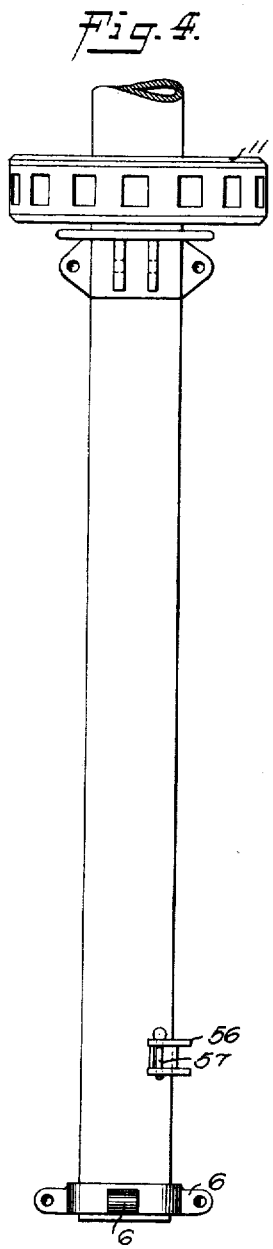
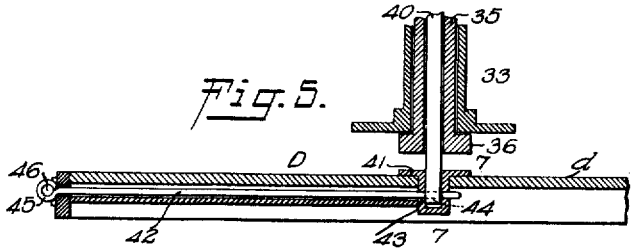
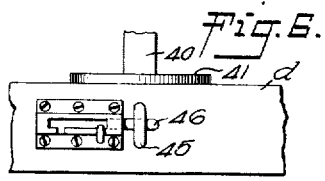
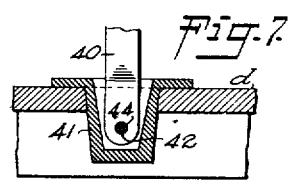
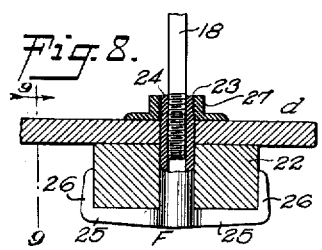
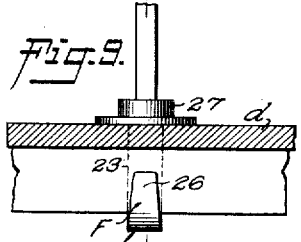
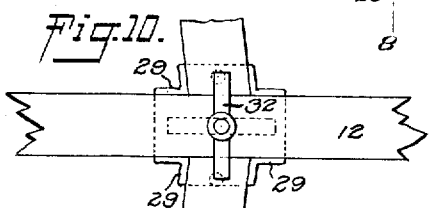
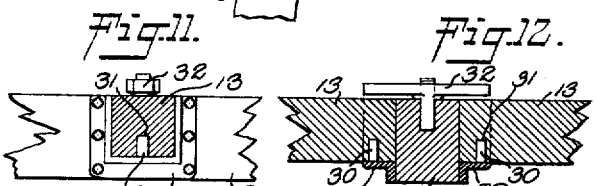
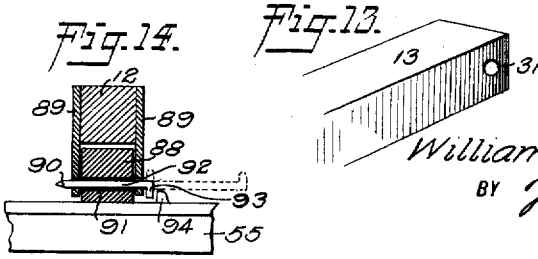
WITNESSES
William P. Goebel
E. Bradway
INVENTOR
William F. Mangels
BY Munn & Co.
ATTORNEYS
THE COLUMBIA PLANOGRAPH CO., WASHINGTON, D. C.

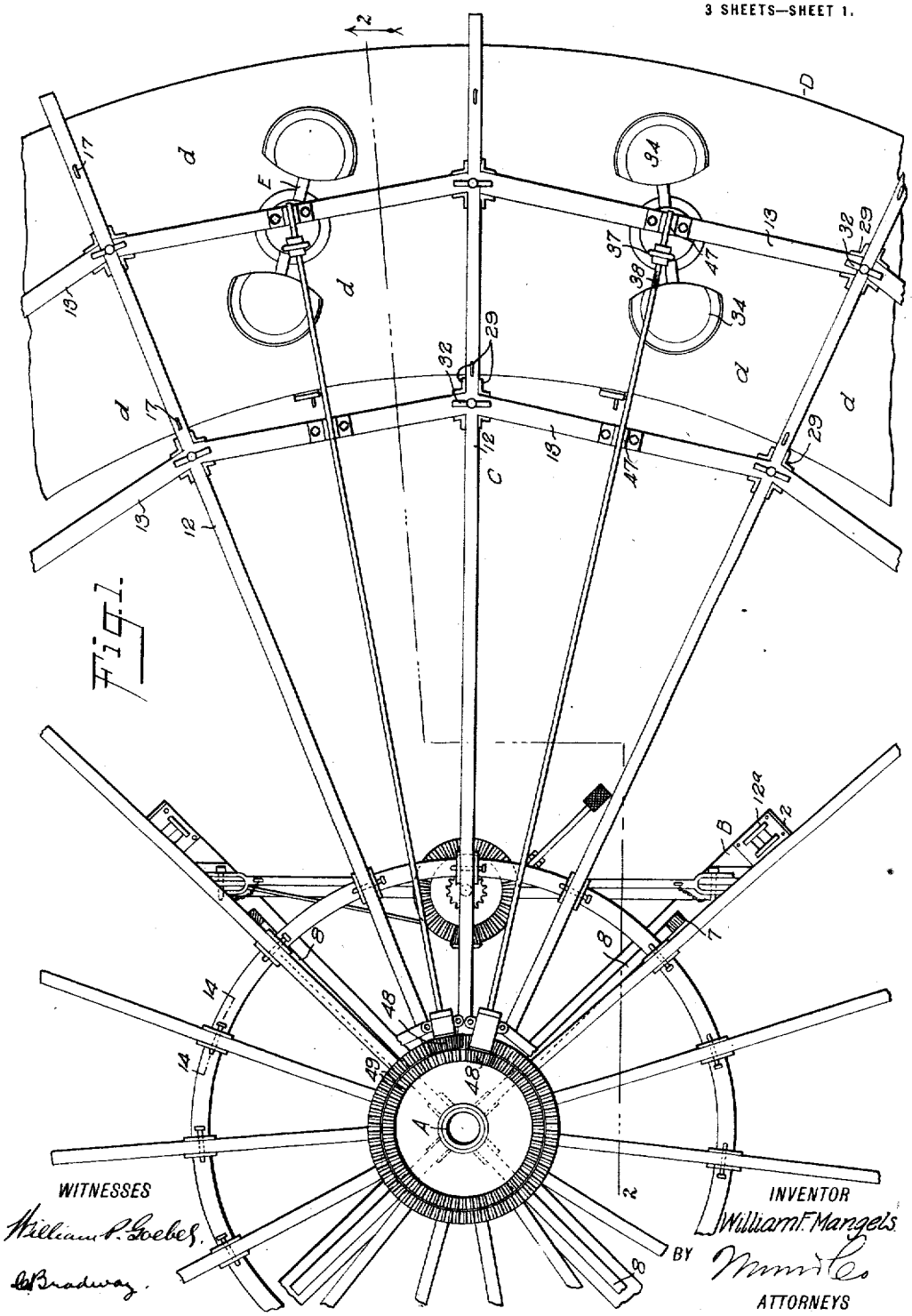

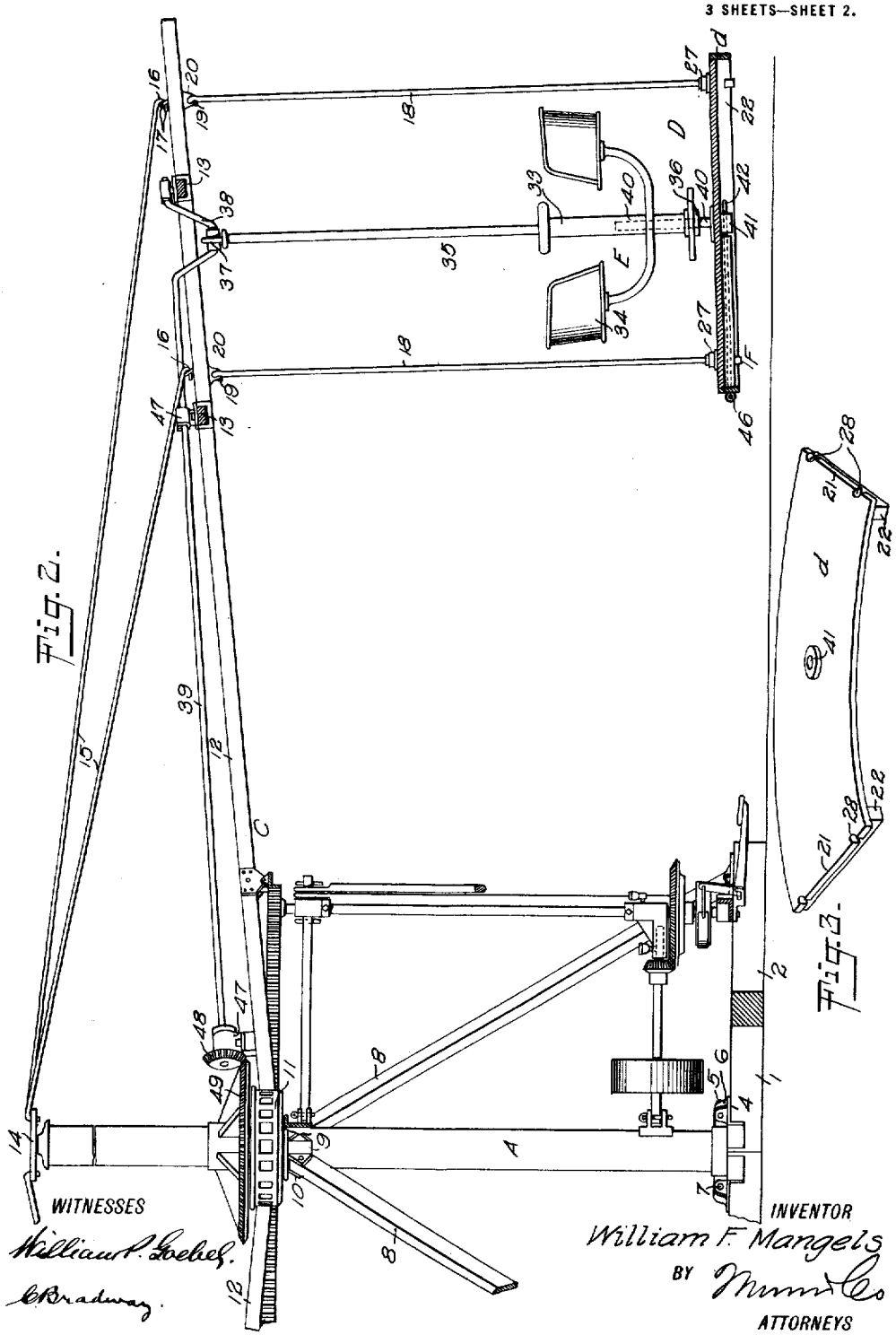

UNITED STATES PATENT OFFICE.

WILLIAM F. MANGELS, OF NEW YORK, N. Y.

CAROUSEL.

1,171,220.  Specification of Letters Patent.  Patented Feb. 8, 1916.

Original application filed July 17, 1914, Serial No. 851,512. Divided and this application filed June 18, 1915. Serial No. 34,818.

*To all whom it may concern:*

Be it known that I, WILLIAM F. MANGELS, a citizen of the United States, and a resident of the city of New York, Coney Island, borough of Brooklyn, in the county of Kings and State of New York, have invented a new and Improved Carousel, of which the following is a full, clear, and exact description.

This invention relates to amusement apparatus, and more particularly to a carousel of the portable or knock-down type, and is a division of my application for Letters Patent Serial No. 851,512, filed July 17, 1914.

The invention has for its general objects to improve and simplify the construction and operation of apparatus of the character referred to so as to be reliable and efficient in use, comparatively inexpensive to manufacture and so designed as to be capable of easy and quick erection or disassemblement.

A further object is to provide a novel form of annular platform for the figures and other passenger carriers, the platform being made in sections which detachably interlock with the platform suspension rods, which rods are formed with a special form of hook for engagement with the platform sections.

An additional object is the employment of novel means for connecting the passenger carriers to the platform in such a manner that they can be readily attached or detached, such passenger carriers being of the compound motion type, whereby they vertically reciprocate while capable of having rotary motion about the axis on which they vertically reciprocate.

Another object is to provide improved connecting means between the outer ends of the platform suspending arms of the carousel rotary structure, such connecting means including devices whereby attachment to or detachment from the said arms can be easily and readily effected.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention, and wherein similar characters of reference indicate corresponding parts in all the views, Figure 1 is a plan view of a portion of the carousel; Fig. 2 is a vertical section on the line 2—2, Fig. 1; Fig. 3 is a perspective view of one of the platform sections or segments; Fig. 4 is a side view of the lower part of the central supporting column; Fig. 5 is an enlarged sectional view through the center of one of the platform segments, showing the manner of connecting a passenger carrier, car or the like to the platform; Fig. 6 is a detail view of the locking bolt for a pintle pin that connects a passenger carriage with a platform segment; Fig. 7 is a detail sectional view on the line 7—7, Fig. 5; Fig. 8 is a sectional view on the line 8—8, Fig. 9, showing the connection between a suspension rod and two adjacent sections of the platform; Fig. 9 is a sectional view on the line 9—9, Fig. 8; Fig. 10 is a plan view of the construction of the joints between the platform suspension arms and the cross-connecting bars; Fig. 11 is a sectional view on the line 11—11, Fig. 10; Fig. 12 is a sectional view on the line 12—12, Fig. 10; Fig. 13 is a perspective view of one end of one of the cross connecting bars between the platform suspending arms; and Fig. 14 is a detail sectional view on the line 14—14, Fig. 1, showing the means for connecting the circular rack with the platform-carrying arms.

Referring to the drawing, A designates the central supporting column which is mounted on a base frame B which is composed of two beams 1 and 2 which extend at right-angles to and across each other, as clearly shown in Fig. 1, the beams 1 and 2 being at the point of crossing halved, so that each beam will be set into the other, whereby the beams are rigidly held in right-angular relation. The top of each beam is provided at opposite sides of the point of crossing with anchor plates 4 which are formed each with upstanding spaced lugs 5, and on the bottom of the column A are radially projecting lugs 6 which are adapted to engage between ears 5 of the anchor plates, and through these lugs and ears fastening means, such as bolts 7, pass so as to rigidly secure the column to the base frame. In erecting the column the latter is supported in a horizontal position, and one of the lugs 6 is engaged between the ears of one of the anchor plates 4, and a bolt 7 is inserted.

The column is then swung upwardly on the bolt as a pivot until a vertical position is reached, when the remaining lugs 6 will enter the respective anchor plates so that the bolts 7 can be applied to rigidly secure the column in position. Obviously the column can be taken down in as easy a manner. To impart the necessary rigidity to the stationary supporting structure of the carousel, the braces 8 are employed between the outer ends of the base beams 1 and 2 and the column A, which latter has at an intermediate point a ring 9 to which the upper ends of the braces are connected by pins or equivalent means 10, the lower ends of the braces being fastened by pins 11ᵃ or the like to anchor pieces 12ᵃ on the outer ends of the beams. Of course, in taking down the carousel these braces 8 are first detached before the column can be disconnected from the base frame.

On the upper part of the column is a wheel construction C which suspends the passenger platform D, and the passenger carriers E. This wheel construction comprises a hub 11 fastened to the column A, and spokes or arms 12 which radiate from the hub 11 and are united at their outer portions by cross-connecting bars 13. On the top of the column is a cap piece 14 to which are connected radially disposed braces 15 which terminate in hooks 16 at their outer ends and detachably engage in eyes 17 on the tops of the arms or spokes 12. Each arm 12 has detachably connected to its outer portion depending parallel suspending rods 18 which carry the platform D, these rods having hooks 19 at their upper ends which removably engage in eyes or equivalent fixtures 20 on the arms 12. It will be understood that when the platform is detached from the overhead structure and the rods 15 are disconnected, the arms 12 can be removed from the hub 11.

The platform D comprises a plurality of segments d which are supported by the suspension rods 18. Each segment has at its radial ends 21 cleats 22, Figs. 3, 8 and 9, fastened to the under side thereof, and inverted T-shaped connecting devices F engage with these cleats to clamp the sections together. Each device F comprises a central stem 23 that is provided with an interiorly-threaded socket 24 to receive the lower end of a suspension rod 18 which screws into the socket, and the laterally extending members 25 engage under the cleats 22, and on these members are upwardly-extending extensions 26 which engage the outer vertical edges of the cleats. In other words, the device F comprises a pair of oppositely-disposed hooks into which the cleats set. On the socketed stem 23 of the device F is screwed a clamping collar 27 which engages the top surface of two adjacent segments d and clamps them to the hooks 25. Thus, in assembling the platform the suspension rods are first hooked on the arms 12 with the segment connecting devices F attached to the rods and with the collars 27 loose from the stems 23. The platform segments d are then placed in position, one segment being disposed between adjacent sets of suspension rods 18, and when in assembled position each segment rests on two pairs of supporting hooks 25. To insure circular alinement of the segments and to prevent outward radial displacement the edges are provided with recesses 28, as clearly shown in Fig. 3, so as to fit the stems 23. After the segments are positioned the collars 27 are screwed on the stems 23, so that the segments of the platform will be rigidly held in place.

The cross-connecting bars or braces 13 have their ends detachably connected with adjacent arms or spokes 12 by means shown in Figs. 10 to 13 inclusive. Each arm has on opposite sides U-shaped socket pieces or brackets 29, and on the bottom of each is an upstanding stud 30 which is adapted to engage in an opening 31 in the bottom surface of the cross-bar 13 at the end, as shown in Fig. 13. The bars 13 are of just such length as to set in between two adjacent arms 12, and in being lowered into the socket pieces 29 the studs 30 will enter the openings 31. To hold the cross-bars in their socket pieces a keeper 32 in the form of a centrally pivoted turn button is mounted on each arm 12 at a point between each pair of oppositely disposed brackets 29, so that one keeper will hold the adjacent ends of alining connecting bars 13 fastened to their intermediate arm 12. By uniting the arms 12 of the overhead structure with the cross-connecting bars in this manner no fastenings are required to be inserted or removed, it being merely necessary to turn the keeper to the dotted-line position, Fig. 10, so that the cross bars can be inserted or removed.

Any suitable passenger carriers, cars, figures or the like may be arranged on the platform, but in the present instance the passenger carriers E are of that type which have compound motion. In the present instance the carrier E comprises a central rotary post 33 or equivalent means with a plurality of seats 34 mounted thereon, and passing through this post is a rod 35 around which the carrier E can rotate as an axis. This rod has a bearing collar 36 on which the bottom of the post 33 rotatably rests and the upper end 37 of this rod 35 is hooked over a crank 38 in the outer end of a crank shaft 39, so that as the crank shaft rotates the rod 35 will have a vertical up and down movement. The lower end of the rod 35 is connected by a slip joint device with the platform D, such device consisting, as shown in Figs. 2, 5 and 7, of a short vertically-disposed rod 40 which telescopes into the lower end of the rod 35 which is tubular to receive the member 40. The lower end of the member 40 enters a socket or bearing piece 41 and is hingedly connected therewith by a pintle pin 42. This pintle pin passes through openings 43 and 44 in the central piece 41 and member 40 and is long enough to extend radially of the platform D to the inner edge thereof and there terminates in an eye 45 which is engaged by a slide bolt 46, as shown in Fig. 6. By removing the slide bolt 46 the pintle pin 42 can be pulled out far enough to disengage the member 40 from the platform, as when the carousel is to be taken down. It will be observed from Fig. 1 that the passenger carriers E are located at the center of the platform segments $d$, so that the pintle pins 42 extend radially and centrally of the said platform sections. By hingedly connecting the members 40 with the platform the carrier reciprocating rod 35 can oscillate with the rotation of their cranks 38, so that the passenger carriers E have a compound motion which is the resultant of three motions, namely, the rotary motion due to the passengers in turning the carrier, the vertical reciprocatory motion due to the rotation of the crank 38, and the oscillatory motion also due to the crank. The crank shafts 39 are removably mounted in bearings 47 arranged on the arms 12, and the inner ends of the crank shafts are provided with beveled pinions 48 which mesh with one or more stationary beveled gears 49 fastened on the column A above the hub 11.

From the foregoing description taken in connection with the accompanying drawings, the advantages of the construction and method of operation will be readily understood by those skilled in the art to which the invention appertains, and while I have described the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. In a carousel, the combination of a rotary structure including a suspension passenger platform, crank shafts on the said structure, a rod detachably connected with and suspended from each crank shaft to be reciprocated and oscillated thereby, a member telescopically connected with each rod, sockets on the platform for receiving the lower ends of the members, and removable pivots disposed under the platform for connecting the members with the sockets.

2. In a carousel, the combination of a rotary structure including a suspension passenger platform, crank shafts on the said structure, a rod detachably connected with and suspended from each crank shaft to be reciprocated and oscillated thereby, members telescopically connected with each rod, sockets in the platform in which the lower ends of the members are disposed, and pivot rods detachably and hingedly connecting the members with their respective sockets, said rods extending to the edge of the platform so as to be accessible.

3. In a carousel, the combination of a rotary structure including a suspension passenger platform, crank shafts on the said structure, a rod detachably connected with and suspended from each crank shaft to be reciprocated and oscillated thereby, members telescopically connected with each rod, sockets in the platform receiving the lower ends of the members, pintle pins extending through the sockets and members for hingedly and detachably connecting the latter to the sockets, and keepers for holding the pintle pins removably in position.

4. In a carousel, the combination of a rotary structure including suspension devices, and a platform composed of sections each supported by a plurality of suspension devices, each section having cleats fastened to its under side at the ends thereof, and the devices extending under and interlocking with the cleats for holding the sections in alinement.

5. In a carousel, the combination of a rotary structure including suspension rods, double hook members fastened to and carried by the lower ends of the rods, and a platform made in sections engaged with and supported by the said members, the ends of said sections meeting in planes coincident with the rods and having recesses to engage the said members, whereby outward radial displacement of the platform sections is prevented.

6. In a carousel, the combination of a rotary structure including sets of suspension rods, an inverted T-shaped member on the lower end of each rod, and platform segments resting on the said T-shaped members.

7. In a carousel, the combination of a rotary structure including sets of suspension rods, an inverted T-shaped member on the lower end of each rod, platform segments resting on the said T-shaped members, and devices on the T-shaped members for engaging the top surfaces of the platform sections to clamp the same to the members.

8. In a carousel, an annular passenger platform made in sections joined end to end and having recesses in their end surfaces, suspension rods passing between the ends of adjacent sections, and means on the rods engaging in the said recesses and also engaging under and supporting the sections.

9. In a carousel, a passenger platform made in sections joined end to end, each section having end cleats on its under side, suspension rods for the platform, and devices attached to the lower ends of the suspension rods and passing between adjacent sections and having oppositely disposed hooks for engaging cleats of such adjacent sections.

10. In a carousel, a passenger platform made in sections joined end to end, each section having end cleats on its under side, suspension rods for the platform, devices attached to the lower ends of the suspension rods and passing between adjacent sections and having oppositely disposed hooks for engaging cleats of such adjacent sections, and members applied to said devices to engage the upper surfaces of the sections for clamping the same in engagement with the hooks.

11. In a carousel, a passenger platform made in sections joined end to end, each section having end cleats on its under side, suspension rods for the platform, socketed devices threaded on the lower ends of the rods and having oppositely-extending hooks for engaging the cleats of adjacent sections of the platform, and a collar threaded on each device for engaging the top surfaces of adjacent platform sections for clamping the same in position.

12. In a carousel, the combination of a column, a hub mounted thereon, members removably mounted in the hub, cross connecting bars fitting in between adjacent arms, and devices on the arms and into which the ends of the bars are inserted downwardly, said devices and bars being shaped to automatically interlock as the bars are inserted in the devices.

13. In a carousel, the combination of a column, radiating arms detachably mounted thereon, brackets arranged on opposite sides of the arms, cross-bars extending from one arm to another and seated downwardly in the brackets, and interlocking means between the cross-bars and brackets, whereby the cross-bars rigidly connect adjacent arms together.

14. In a carousel, the combination of a column, radiating arms detachably mounted thereon, brackets arranged on opposite sides of the arms, cross-bars extending from one arm to another and seated downwardly in the brackets, interlocking means between the cross-bars and brackets, whereby the cross-bars rigidly connect adjacent arms together, and keepers mounted on the arms to engage over the ends of the cross-bars to hold the same seated.

15. In a carousel, the combination of a supporting column, radiating arms thereon, brackets on opposite sides of the arms, upwardly-extending studs in the bottoms of the brackets, and cross-bars extending from one arm to another, with their ends seated in the brackets and having openings to receive the studs of the brackets.

16. In a carousel, the combination of a supporting column, radiating arms thereon, brackets on opposite sides of the arms, upwardly-extending studs in the bottoms of the brackets, cross-bars extending from one arm to another, with their ends seated in the brackets and having openings to receive the studs of the brackets, and keepers pivotally mounted on the arms and arranged to engage the ends of adjacent bars to maintain the same seated in the brackets.

In testimony whereof I have signed my name to this specification in the presence of two subscribing witnesses.

WILLIAM F. MANGELS.

Witnesses:
C. BRADWAY,
PHILIP D. ROLLHAUS.